United States Patent Office 2,804,428
Patented Aug. 27, 1957

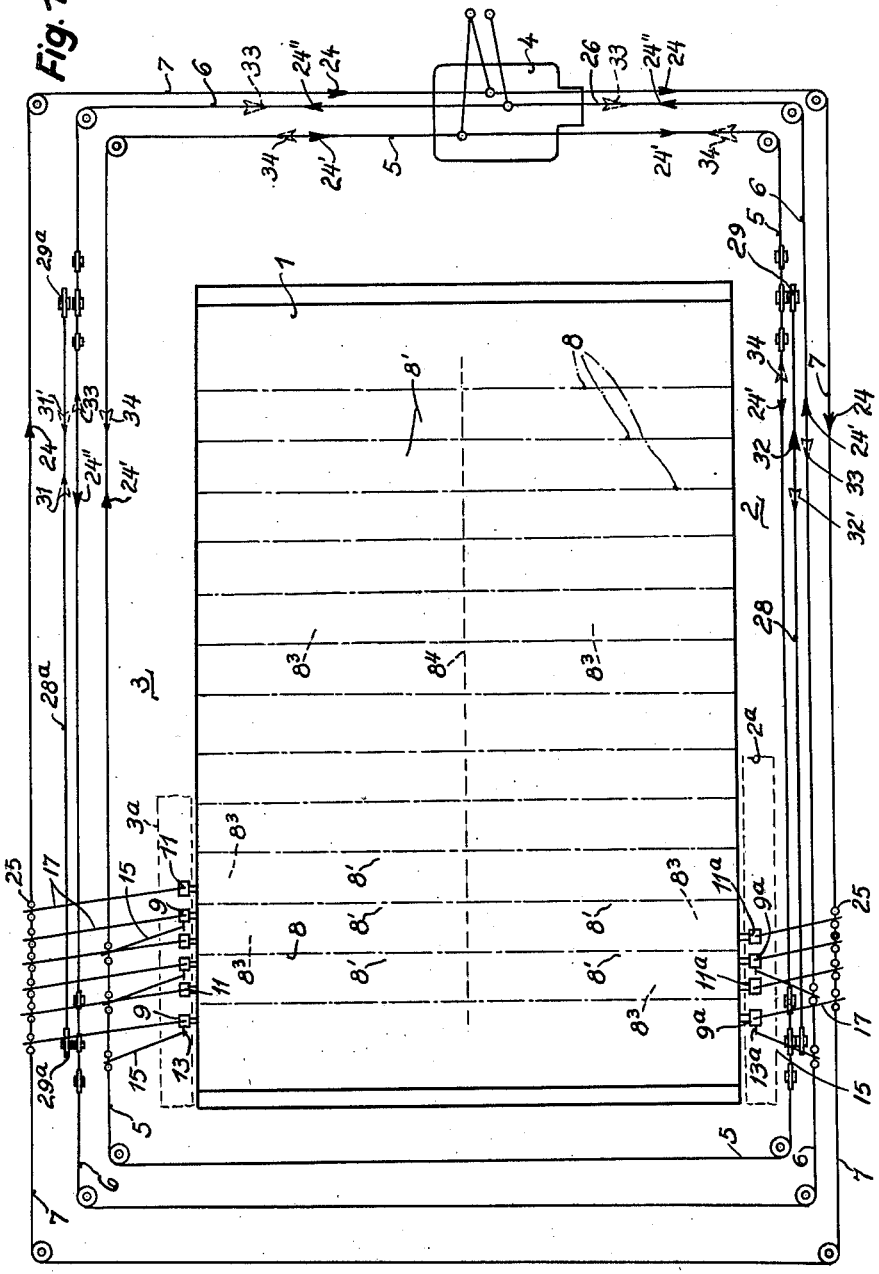

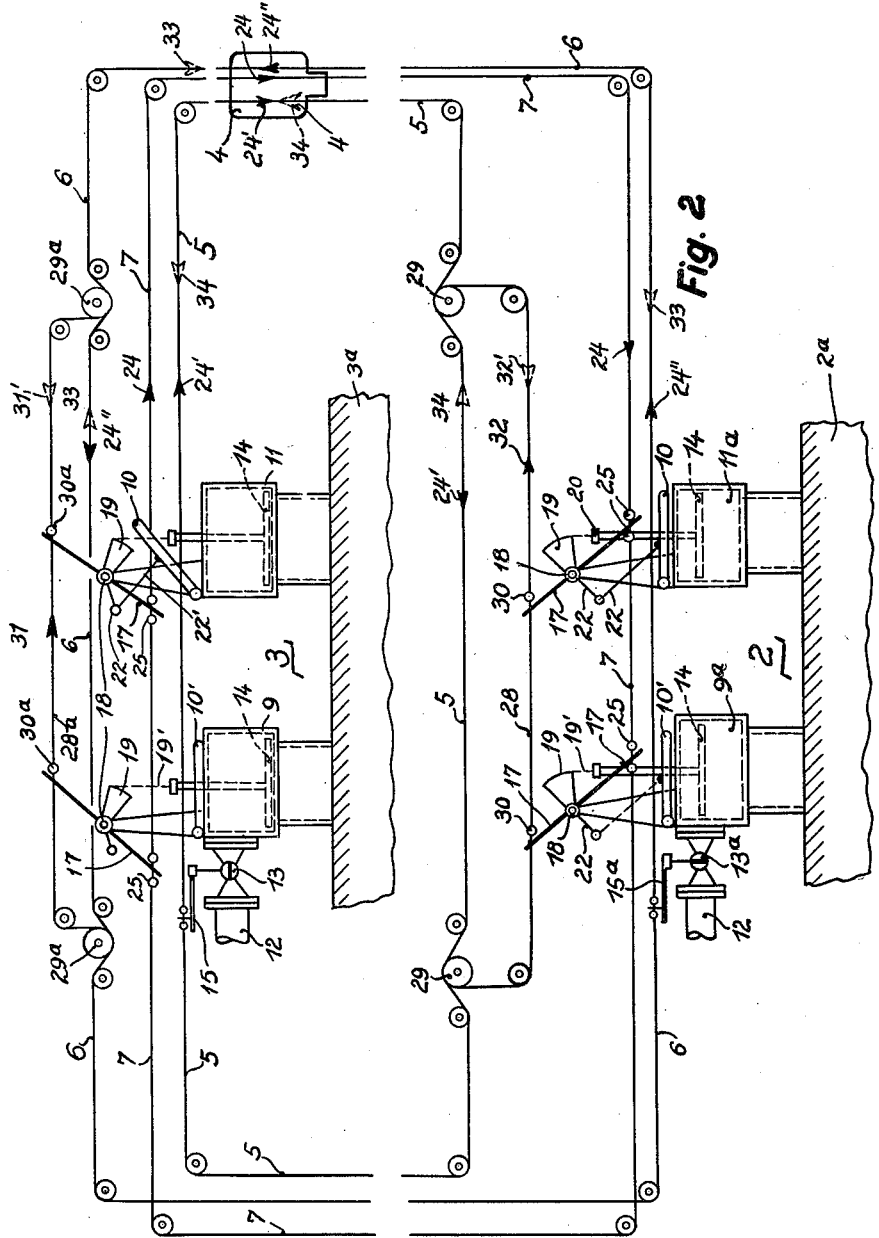

2,804,428

REVERSAL APPARATUS FOR REGENERATIVE OVENS

Paul Van Ackeren, Essen, Germany, assignor, by mesne assignments, to Koppers Company, Inc., Pittsburgh, Pa., a corporation of Delaware Application April 6, 1953, Serial No. 346,851

3 Claims. (Cl. 202—151)

This invention concerns the reversal apparatus for regenerative ovens and has particular reference to safety means for remedying defects in operation of the reversal apparatus of regenerative coke oven batteries, whereby the closure of the gravity closing waste gas valves, due to breakage of tension members which hold them open, is prevented by auxiliary means controlled by the open position of fuel gas valves that feed the gaseous fuel for combustion that flows out as waste gas through said waste gas valves. The invention is applicable to regenerative ovens adapted to be heated either by combustion of regeneratively heated lean (producer or blast furnace) fuel gas and air or by the combustion of rich (coke oven) fuel gas and regeneratively heated air.

In regenerative ovens, cyclic operation is practiced, the air for combustion passing through hot regenerators and being thereby heated before mixture with the fuel gas for combustion in the oven heating flue system, the products of such combustion (waste gas) being led from the oven heating flue system to further regenerators, which are thereby heated up; in one cycle of operation the air and waste gas flow in one direction through the oven heating system and during a subsequent cycle, the air is passed through those regenerators which were traversed by the waste gases during the previous cycle, the waste gases in such subsequent cycle passing through the regenerators which were traversed by the air in the preceding cycle. Where such regenerative ovens are to be heated by the combustion of lean fuel gas and air, then this lean gas is also passed through regenerators for heating prior to its mixture with the air for combustion in the oven heating system; with rich fuel gas, such preheating of the fuel gas is not necessary.

The admission of air (or air and lean fuel gas) to the regenerators, and the escape of waste gas from the regenerators to waste gas flues is controlled by suitable valve means, and at the end of each of the cycles of operations of the oven, reversal of the direction of gas-and air-flow is effected by appropriate operation of these various valve means; customarily this operation of the various valve means is effected by a reversing machine such as a single reversal winch which is connected by means of tension members, such as rods or chains or the like, to the various valve means to operate these in the appropriate sequence.

The usual sequence of operating the various valve means comprises closing the fuel gas cocks which were previously on operation, closing the air valves to the regenerators which were preheating the air for combustion, whilst simultaneously opening the waste gas valves of these regenerators to place them in communication with the waste gas flue and also closing the waste gas valves of the regenerators which were previously exposed to waste gas and opening the air valves of the latter regenerators, and finally opening the fuel gas cocks which were shut off during the previous cycle. When operating on lean gas, a short purge interval usually elapses after the closure of the fuel gas cocks and before operation of said waste gas valves and said air valves in order that lean gas trapped in the oven heating flue system may be burnt before reversal of flow through the heating system is accomplished. The said valve means for the regenerators usually comprise composite valves each consisting of a hollow box or body connecting a regenerator with a waste gas flue, the waste gas valves each comprise a heavy plate therein which is raised from and lowered on to a seat in the body to establish or break communication between the regenerator and the waste gas flue, whilst the air valves each comprise a pivoted flap covering an opening in the top of the said box or body and raised to permit ingress of air into the said body; where lean fuel gas heating is employed, the composite valves of appropriate regenerators (usually alternate regenerators) have a further connection to their bodies, these connections being supplied with lean fuel gas through lean fuel gas cocks from a lean fuel gas main.

The operating members for the various valves are connected to the aforesaid tension members which are actuated by the reversal winch for sequential operation of the valves. In a coke oven battery in which there are a large number of valves to be operated on each reversal, a single tension member from the reversal winch is usually connected to all the fuel gas cocks which are to be opened during one operating cycle, another tension member from the reversal winch is connected to all the fuel gas cocks which are to be opened during the next operating cycle, and a third tension member is connected to the operating members of all the waste gas valves and the air valves in such a manner that movement of that tension member in one direction or the other effects the appropriate opening and closing of each half of these two sets of valves.

The latter tension member, or reversing or control member, as it is usually termed, is always under tension since during one operating cycle it is supporting the weight of the waste gas valves of one set of regenerators and the air valves of the other set of regenerators to maintain both of these kinds of valves of the two sets open, whilst in a next operating cycle, the previously closed waste gas valves and the previously closed air valves of the two sets of regenerators are maintained open while the first mentioned valves are closed. Thus this tension member is subjected to considerable stress and more liable to breakage than the tension members connected to the fuel gas cocks.

Should the said tension member break, the valves that are supposed to be held open thereby will close under their own weight and it will be apparent that if this happens, the oven heating system will rapidly fill with gas which cannot burn because no air is being supplied to the system and which cannot escape owing to the closure of the waste gas valves. The said tension member will usually break in such a place that only those valves which were held open at the instant of breakage will be affected; consequently on a next subsequent reversal, if the breakage of the tension member has not been discovered or remedied, the opening of the unaffected waste gas valves and air valves will result in the gas accumulated in the heating system mixing with and being expelled by the incoming air into the waste gas flue. Explosive mixtures can thus form in the oven heating system, which, if ignited, cause blowing back through the open air valves and moreover, the entry of unburnt gas into the waste gas flue is conducive to serious explosions therein.

The primary object of the present invention is to provide means for overcoming the dangers attendant upon breakage of the tension member controlling the waste gas valves and air valves of regenerative ovens.

Accordingly the present invention provides, in a regenerative oven, means connected with the fuel gas cock or cocks in the open position during any operation cycle of the oven to prevent gravity closure of the waste gas and air valves in the open position during the same cycle without prior closure of said fuel gas cock or cocks.

Thus, where the said waste gas and air valves are controlled by a tension member acctuated by a reversal winch, breakage of such tension member will not result in closure of the waste gas and air valves which were held open thereby previous to breakage of the tension member and if such breakage is not noticed when the next reversal operation is due, then the reversal operation will take place in the normal manner, except that as soon as the open fuel gas cock or cocks close, the open waste gas and air valves will also close, without the usual purge interval between these two operations. Thus the only disadvantageous result will be wastage of the gas in the oven heating system, which would normally have been burnt during said purge interval which follow upon following closure of the fuel gas cock or cocks and before closure of the said waste gas and air valves. Moreover, if the breakage of the said tension member is not noticed by the time a further succeeding reversal is due, the reversal operation will again take place normally except in that the waste gas and air valves which are to be opened at this reversal, and which are connected with the broken tension member, will not open until they are opened by the opening of the fuel gas cock or cocks at the completion of the reversal operation.

Further features of the invention will become apparent from the following description of an embodiment thereof illustrated by way of example in the accompanying drawings, in which:

Figure 1 shows diagrammatically in plan view a conventional regenerative coke oven battery, heated by lean fuel gas, and the reversal valve means associated therewith and their connections with the reversal winch; and Figure 2 illustrates in more detail the reversal valve means associated with each oven of the battery and their connections with the reversal winch.

In the drawings there is shown a coke oven battery 1 comprising a plurality of horizontal coke ovens 8¹ which are divided by walls, indicated at 8, in which are arranged heating flues connected with regenerators 8³ at a lower level at each side of the longitudinal central plane 8⁴ of the battery 1 oven.

On one side 2 of the battery 1 are shown reversal valve means 9a for gas and 11a for air. These reversal valve means are associated with each pair of the regenerators of the set at that side of the battery. For convenience of illustration there is indicated in Fig. 1 only two pairs of regenerators, with each pair associated with a heating wall 8 intermediate two adjacent ovens 8¹ in the battery. The valve means 9a, 11a, control the admission of air and lean fuel gas to such pairs of regenerators and the passage of waste gas from such pairs of regenerators to a waste gas flue 2a at side 2 of the battery. On the other side 3 of the battery are shown the reversal same kind of valve means 9 for gas and 11 for air associated with the regenerators of the set at that side of the battery, only those for three pairs of regenerators of three adjacent ovens 8¹ in the battery being indicated.

The reversal valve means 9, 11, 9a and 11a are all operated by a conventional reversing means, i. e., a reversal winch, indicated diagrammatically at 4, which is connected via a control member in the form of a tension member 5 with the lean fuel gas cocks 13 of the valve means 9 on the side 3 of the battery. Another control member in the form of a tension member 6 connects the reversal winch 4 with the lean gas cocks 13a of the valve means 9a on the side 2 of the battery. A third control member in the form of a tension member 7 connects the reversal winch 4 with operating members for the waste gas and the air valve 14 of the valve means 9 and 11 on the battery side 3 and ofthe valve means 9a and 11a of the battery side 2.

As clearly shown in Figure 2, lean gas is supplied to the lean fuel gas cocks 13, 13a from a lean gas main 12, and the connection between the tension member 5 and the lean fuel gas cocks 13 is effected by means of pairs of stops on the tension member which co-operate with a lever 15 on each of the lean fuel gas cocks so that movement of the tension member 5 in the direction of the open arrow 34 effects opening of lean gas cocks 13, and movement in the direction of the closed arrowhead 24′ thereon effects closure of the lean fuel gas cocks 13. A similar connection is effected between the tension member 6, via a lever 15a, and the lean fuel gas cocks 13a of the composite valve 9a whereby movement of member 6 in the direction of closed arrow 24″ closes gas cocks 13a, and movement in the direction of open arrow 13 opens gas cocks 13a.

The tensioned member 7 operates the waste gas valves 14 of the composite valves 9, 9a, 11 and 11a by means of stops 25 on the tension member 7 which co-operate with an operating lever 17, associated with each of the composite valves, which is pivoted at 18 so that longitudinal movement of the tension member 7 effects swinging of the levers 17 about their pivots. The levers 17 each carry a sector 19 to which is attached a rope or chain 19′ connected with the waste gas valve 14 of the associated composite valve. Thus movement of the tension member 7 in the direction of the closed arrowhead 24 thereon will cause the waste gas valves 14 of the composite valves 9 and 11 to be opened and the waste gas valves 14 of the composite valves 9a and 11a to be closed and movement in the opposite direction closes valves 14 for boxes or bodies 9 and 11, and opens valves 14 for boxes or bodies 9a and 11a.

The operating levers 17 of the composite valves 11 and 11a are each furnished with a lever 22 which is attached by means of a rope or the like 22′ to the air valve 10 of the associated composite valve, the arrangement being such that opening of the waste gas valve 14 of such composite valve is accompanied by closure of the air valve 10.

In accordance with the present invention, the tension member 5 for valves 13 on the side of the battery, extends around the whole battery, and on the side 2 of the battery passes around pulleys 29, arranged at each end of the battery, to which are secured auxiliary control means, comprising an auxiliary control in the form of a further tension member 28. This tension member 28 is furnished with stops 30 for moving each of the operating levers 17 for the waste heat valves 14 and flap valves 10 on the side 2 of the battery and, as shown in Figure 2, these stops 30 are so disposed that they co-operate with the levers 17 on the side 2 to hold them in the position in which the waste gas valves 14 of the composite valves 9a and 11a on side 2 are open whilst the lean fuel gas cocks 13 on the side 1 are open. Movement of the tension member 5 in the direction of the open arrow 34 to open cocks 13 moves member 28 in the direction of open arrow 32′ to engage stops 30 with levers 17 to open valves 14 of boxes 9a and 11a, and movement of member 5 in the direction of the closed arrowhead 24′ thereon to close cocks 13 causes movement of the tension member 28 in the direction of the closed arrowhead 32 thereon, and this movement of the tension member 28 removes the stops 30 from the proximity of the levers 17 of the composite valves 9a and 11a allowing them to seat or close.

The tension member for the valves 13a on the side 2 of the battery also passes around the whole battery and on side 3 thereof passes over pulleys 29a having secured thereto another part of the auxiliary control means comprising an auxiliary control in the form of a further tension member 28a. Tension member 28a, like the tension member 28, is furnished with stops 30a which, when the lean fuel gas cocks 13a are open, are positioned to hold the levers 17 of the composite valves 9 and 11 in the position in which the waste gas valves 14 thereof are open. Movement of the tension member 6 in the direction of the closed arrowhead 24 thereon effects a closing movement of cocks 13a on the side 2 and a closing movement of the tension member 28a in the direction of the closed arrowhead 31, and movement of member 6 in the direction of open arrow 33 to open cocks 13a causes movement of member 28a in the direction of open arrow 31' to engage stops 28a with levers 17 to open valves 14 of boxes or bodies 9, 11.

In the drawings, the disposition of the various valves of the valve means is such that the lean fuel gas cock 13 is open and the waste gas valves 14 of the composite valves 9 and 11 are closed, whilst the air valve 10 of the composite valve 11 is open; the waste gas valves 14 of the composite valves 9a and 11a are open, the air valve 10 of the composite valve 11a is closed, and the lean fuel gas cocks 13a is closed.

It will be apparent that, should the tension member 7 break whilst the disposition of the various valves is as shown in Figure 2, the air valve 10 of the composite valve 11 on the side 3 will be maintained open because the weight of the valve 14 is greater than that of the air valve 10. On the battery side 2, however, the waste gas valves 14 of the composite valves 9a and 11a will be prevented from closing because the levers 17 of these composite valves will abut the stops 30 of the tension member 28. Thus there will be no disturbance of the various valves.

If the breakage of the tension member 7 is not noticed or remedied by the time the next reversal is due, movement of the tension member 5 in the direction of the closed arrowhead 24' thereon to close the lean fuel gas cocks 13 will cause movement of the tension member 28 in the direction of the closed arrowhead 32 thereon, and the waste gas valves 14 of the composite valves 9a and 11a will therefore close under their own weight, the air valve 10 of the composite valve 11a will simultaneously open. When the tension member 6 is also then moved in the opposite direction as indicated by the open arrowhead 33 thereon to open the lean fuel gas cock 13a, the tension member 28a will also be moved in the opposite direction of the arrowhead 31' thereon and the stops 30a co-operating with the levers 17 of the composite valves 9 and 11 will cause the waste gas valves 14 of these composite valves to open and the air valve 10 of the composite valve 11 to close. Reversal will thus take place in the normal manner except insofar as the waste gas valves 14 of the composite valves 9a and 11a will close immediately upon closure of the lean fuel gas cocks 13 instead of after the customary purge interval.

If the breakage of the tension member 7 is not noticed or remedied by the time another reversal is due, this reversal operation will also take place substantially normally, since the first operation will be movement of the tension member 6 in the direction of the closed arrowhead 24 thereon, this movement of the tension member 6 being accompanied by closure of the lean fuel gas cock 13a and, simultaneously, closure of the waste gas valves 14 of the composite valves 9 and 11 and opening of the air valve 10 of the composite valve 11 as a result of movement of the tension member 28a in the direction of the closed arrowhead 31 thereon. Finally, when the tension member 5 is moved in the direction of the open arrowhead 34 thereon to open the lean fuel gas cock 13, the waste gas valves 14 of the composite valves 9a and 11a will be opened and the air valve 10 of the composite valve 11a closed as a result of the co-operation between the stops 30 and the levers 17 of the said composite valves.

In a regenerative oven battery heated by the combustion of rich fuel gas and air, the arrangement would be similar to that above described except in that the tension members 5 and 6 would be connected to operate the rich fuel gas cocks on sides 3 and 2 respectively of the battery and, of course, the operating levers 17 of the valve means 9 and 9a would also be connected to the air valves 10' of those composite valves so that such air valves opened upon closure of the waste gas valves 14 thereof and vice versa.

I claim:

1. In a regenerative oven, the combination with a heating system having two sets of regenerators operable in alternation with each other for concurrent inflow preheating and outflow of waste gas and two sets of fuel gas cocks likewise operable in alternation with each other in correspondence with the inflow operation of the two sets of regenerators, respectively, waste gas outlet valves and air inlet valves for each regenerator, individual valve operating means for each regenerator operable for individually simultaneous opening of the air valve upon closure of the waste gas valve and simultaneous closing of the air valve upon opening of the waste gas valve, each said valve operating means being normally biased to close the waste heat valve under gravity, fuel gas reversal means connected with the respective sets of fuel gas cocks to open and close the same in alternation, and regenerator reversal means connected with the individual valve operating means of the two sets of regenerators, to reverse their waste gas and air valves, of auxiliary means operable by the opening and closing of the fuel gas cocks, during any operation cycle of the oven, and operatively connecting each of said fuel gas cocks, individually with the valve operating means of the corresponding waste gas valve for concurrent outflow of the waste gas of the fuel gas from the respective fuel gas cocks, to hold the respective waste gas valves open, when their corresponding fuel gas cocks are open, independently of the operation of the individual valve operating means for the respective waste gas valves by said regenerator reversal means and to allow the individual valve operating means to close their respective waste gas valves by gravity when their corresponding fuel gas cocks are closed.

2. In a regenerative coke oven, the combination with two sets of regenerators and two sets of fuel gas cocks, waste gas valves and air valves associated with the regenerators of said two sets and biased to close the waste gas valves by gravity, reversal means, a first control member connecting said reversal means with the fuel gas cocks of one set thereof to hold them open during an operating cycle of the oven and displaceable by said reversal means to actuate said cocks to closed position for the next operating cycle of the oven, a second control member connecting said reversal means with the fuel gas cocks of the other set to hold them closed during said operating cycle and likewise displaceable by said reversing means to actuate the other set of fuel gas cocks to open position for the next operating cycle of the oven, a third control member connecting said reversal means with the gravity biased waste gas and air valves of both sets of regenerators and displaceable by said reversing means to hold open the gravity biased waste gas valves and close the air valves of the regenerators of the set operable for outflow in correspondence with the open position of the first set of fuel gas cocks and to release the waste gas valves and the air valves of the regenerators of the set operable for inflow for their gravitational operation to close the waste gas valve and open the air valves in correspondence with the closed position of the second set of fuel gas cocks, of auxiliary means comprising an auxiliary control operable by said first control member and connected with the waste gas and air valves of the set of regenerators for concurrent outflow to hold the waste gas valves open in correspondence with the open positions of said first set of fuel gas cocks independently of their operation by said third control member, and an auxiliary control operable by said second control member and connected with the waste gas and air valves of the set of regenerators for concurrent inflow in correspondence with the closed positions of said second set of fuel gas cocks, to prevent gravital closure of the waste gas and opening of the air valves while the second set of fuel gas cocks under control of the second control member are open independently of their operation of said third control member.

3. Apparatus as claimed in claim 2, and in which the waste gas and air valve of each regenerator includes an operating lever in common with said third control member and with said valves to insure opening of one valve with the simultaneous closing of the other valve, and in which the auxiliary controls for such valves comprise stops associated with the first and second control members and displaceable therewith into and out of engagement with the respective operating levers in common to the third control member, to prevent, during any operating cycle, valve closing movement of the operating levers, upon failure of the third control member, which failure would otherwise allow gravity to open the closed air and close the open waste gas valves of the two sets of regenerators while their corresponding sets of fuel gas cocks are still open to inflow of fuel gas.

References Cited in the file of this patent

UNITED STATES PATENTS

| | | |
|---|---|---|
| 1,176,066 | Koppers | Mar. 21, 1916 |
| 2,015,182 | Kladik | Sept. 24, 1935 |
| 2,234,171 | Hughes | Mar. 11, 1941 |
| 2,388,438 | Otto | Nov. 6, 1945 |

FOREIGN PATENTS

| | | |
|---|---|---|
| 456,415 | Germany | Feb. 23, 1928 |